United States Patent [19]

Welte et al.

[11] Patent Number: 5,698,601
[45] Date of Patent: Dec. 16, 1997

[54] PROCESS FOR THE PRODUCTION OF OPEN-CELLED RIGID POLYURETHANE FOAMS USEFUL AS INSULATING MATERIALS

[75] Inventors: Rainer Welte, Leverkusen; Hans-Joachim Scholl, Köln, both of Germany

[73] Assignee: Bayer Aktiengesellschaft, Leverkusen, Germany

[21] Appl. No.: 636,731

[22] Filed: Apr. 19, 1996

Related U.S. Application Data

[62] Division of Ser. No. 443,503, May 18, 1995.

[30] Foreign Application Priority Data

May 27, 1994 [DE] Germany ............... 44 18 507.3

[51] Int. Cl.⁶ ....................................... C08J 9/38
[52] U.S. Cl. .................. 521/52; 521/133; 521/155; 264/48; 428/69; 428/71; 428/76; 428/318.4; 428/319.1; 428/319.3
[58] Field of Search .................... 521/52, 133, 155; 428/69, 71, 76, 318.4, 319.1, 319.3, 305.5; 264/48

[56] References Cited

U.S. PATENT DOCUMENTS

| | | |
|---|---|---|
| 4,668,555 | 5/1987 | Uekado et al. . |
| 5,083,361 | 1/1992 | Rudy . |
| 5,318,997 | 6/1994 | Okada et al. ................ 521/174 |
| 5,350,777 | 9/1994 | Yuge et al. .................. 521/117 |

FOREIGN PATENT DOCUMENTS

| | | |
|---|---|---|
| 184415 | 6/1986 | European Pat. Off. . |
| 231820 | 8/1987 | European Pat. Off. . |
| 139265 | 12/1979 | Germany . |
| 2040948 | 9/1980 | United Kingdom . |

*Primary Examiner*—John M. Cooney, Jr.
*Attorney, Agent, or Firm*—Joseph C. Gil; Lyndanne M. Whalen

[57] ABSTRACT

Completely open-celled rigid polyurethane foams are produced by subjecting closed-celled or partially closed-celled rigid polyurethane foams to applied external pressure. These open-celled foams are useful as filling material in insulating panels or as insulating foams.

3 Claims, No Drawings

PROCESS FOR THE PRODUCTION OF OPEN-CELLED RIGID POLYURETHANE FOAMS USEFUL AS INSULATING MATERIALS

This application is a division of application Ser. No. 08/443,503 filed May 18, 1995.

BACKGROUND OF THE INVENTION

The present invention relates to a new process for the production of open-celled rigid foams and the use thereof as a filling material in vacuum insulation applications and airtight, closed, gas-filled foams.

Methods for the production of open-celled rigid polyurethane foams have been described in the recent literature because of the increased concern about chlorofluorocarbons (CFCs). New insulation materials and techniques are being sought and tested. EP-A 0,188,806 describes open-celled rigid polyurethane foams useful for the production of vacuum panelling which are made by reacting particular isocyanates with particular polyols in combination with particular stabilizers, cell openers and monofluorotrichloromethane (R11) as the expanding agent. Because R11 is believed to cause damage to the ozone layer of the atmosphere, EP-A 0,581,191 discloses a method for producing open-celled, rigid polyurethane foams in which the expanding agent is an HCFC (i.e., a hydrogen-containing chlorofluorocarbon) or methylene chloride.

Methods for producing open-celled rigid polyurethane foams in which no expanding agent is used have also been sought.

Methods in which the only gases released to the atmosphere are constituents of air such as oxygen, nitrogen or carbon dioxide have also been investigated. One such method is disclosed in EP-A 0,567,027. In EP-A 0,567,027, the expanding agent is $CO_2$ which is generated from water. However, even when the special formulations disclosed therein are used, only from 90 to 96% open cells are obtained.

These values are, however, totally inadequate for vacuum panelling technology, as is taught, for example, in EP-A 0,581,191. (See page 33 .) An evacuated panel having a small amount of residual gas will in the course of time lose its high vacuum through diffusion.

SUMMARY OF THE INVENTION

It is an object of the present invention to provide a process for the production of completely open-celled rigid polyurethane foams.

It is also an object of the present invention to provide a process for producing open-celled rigid foams from conventional rigid polyurethane foams.

It is another object of the present invention to provide a process for the production of completely open-celled rigid polyurethane foams from rigid foams which are wholly or partly closed-celled or even substantially open-celled.

It is a further object of the present invention to provide a process for the production of completely open-celled rigid polyurethane foams which is not limited to particular starting materials or to particular auxiliary agents.

It is an additional object of the present invention to provide completely open-celled rigid polyurethane foams which are particularly useful in the production of insulating boards and foams.

These and other objects which will be apparent to those skilled in the art are accomplished by applying external pressure to a rigid polyurethane foam in which closed cells are present.

DETAILED DESCRIPTION OF THE PRESENT INVENTION

The present invention relates to a process for the production of completely open-celled rigid polyurethane foams. In this process, closed-cell or partially closed-cell rigid polyurethane foams are converted into open-celled rigid polyurethane foams through the application of external pressure. As used herein, the term "completely open-celled" means that the percentage of open cells is greater than 96% which corresponds to a state of fully open cells within the accuracy of the method used to determine open cell content.

In a preferred embodiment of the present invention, the closed-cell or partially closed-cell rigid polyurethane foam used as the starting material in the process of the present invention is produced in a mold in accordance with any of the molding techniques known to those skilled in the art. The mold walls should preferably be such that an airtight barrier such as a film or coating can be formed or applied to the rigid, closed-cell foam present within the mold. The closed cells of the foam are opened while the foam is still within the mold by applying external pressure.

The present invention also relates to the open-celled rigid polyurethane foams produced by the process of the present invention. These open-cell rigid foams are particularly useful as filling material in evacuated insulating panels especially when the foam is coated with an airtight film made of plastic or metal or made of composite films of plastic or plastics and metal or metals or glass or ceramic materials prior to evacuation (i.e., opening of the foam cell walls).

The foams of the present invention are also useful as insulating foams which are resistant to shrinkage; as filling material in airtight insulating panels when the foam is filled with an insulating gas which is heavier than air (preferably a heavy insulating gas which is virtually insoluble in the cell material) after the closed cells have been opened; as insulating material in refrigerators, in refrigerator vehicles, in freezers, freezing vehicles, containers, freezing counters, cooling counters, hot water containers and containers used in industrial construction and in the heat-distributing industry.

The present invention also relates to an evacuated insulating panel which is made up of a) an open-celled rigid polyurethane foam obtained in accordance with the present invention and b) an airtight coating film made of b1) plastic or metal or b2) made of a composite film of plastic or plastics and metal or metals or b3) glass compositions or b4) ceramic compositions.

The present invention also relates to Insulating panels filled with an insulating gas which is heavier than air, which are made up of a) an open-celled rigid polyurethane foam produced by applying external pressure to a rigid, closed-cell foam and b) an airtight coating film made of b1) plastic or metal or b2) made of a composite film of plastic or plastics and metal or metals or b3) glass compositions or b4) ceramic compositions.

It must be regarded as extremely surprising that the foam does not break down in the course of the pressure treatment according to the invention. The application of external pressure to the closed cell rigid foam results only in the presence of the desired completely open cells due to the formation of cracks in the cell walls. That is, the cell walls are still present but these cell walls are opened by cracks.

In contrast to the present invention, the cell walls are destroyed by "blowing off" in the final stages of prior art processes for the production of open-celled polyurethane foams.

Different methods for producing foams with open cells result in foams having significantly different insulating properties. If the cell walls are merely opened by cracks (in accordance with the present invention), the effective free path length of the cell gas is restricted mainly to the diameter of the cell. This restriction of the free path length results in an improved insulating effect. This improved insulating effect makes the foams of the present invention particularly useful in vacuum panelling technology.

The open-celled rigid polyurethane foams of the present invention may, however, also be used as insulating materials in panels at normal pressure or in the range between high vacuum and normal pressure, if the cells are filled with a heavy gas (that is, a gas which is heavier than air) such as a heavy rare gas, an organic volatile gas, a CFC or a fluorocarbon.

CFC expanding agents may no longer be used in conventional insulating materials because they enter the atmosphere by diffusion or during destruction and disposal of old appliances. However, CFCs can be used without problems in open-celled foams having airtight external coats because the CFCs do not diffuse into the atmosphere and can be readily liberated by evacuation during disposal.

Any of the starting materials known by those skilled in the art to be useful in the production of rigid polyurethane foams containing at least some closed cells may be used to produce the closed cell foams used in the practice of the present invention. Methods and materials useful for the production of closed-cell, rigid polyurethane foams are disclosed, for example, in Kunststoff-Handbuch, Volume VII, "Polyurethanes", edited by G. Oertel (Publisher Carl Hanser, Munich 1993), pages 267 ff.

The closed-cell or partly closed-cell rigid foams used as the starting material in the practice of the present invention generally have bulk densities in the range of from about 20 to about 200 kg/m$^3$, preferably from about 30 to about 100 kg/m$^3$.

The conversion of the closed-cell rigid foams into the corresponding, completely open-celled rigid polyurethane foams in accordance with the present invention is accomplished by applying external pressure, for example, in pressure chambers. The amount of pressure to be applied and the period of application depend upon the particular closed-cell rigid foam being used. The amount of pressure and length of time such pressure should be applied may easily be determined by a simple preliminary experiment. Generally, pressures of from about 2 to about 20 bar for from about 1 to about 60 seconds are sufficient.

Having thus described our invention, the following Examples are given as being illustrative thereof. All parts and percentages given in these Examples are parts by weight or percentages by weight, unless otherwise indicated.

EXAMPLES

Example 1

A conventional rigid polyurethane foam having a bulk density of 50 kg/m$^3$ and a percentage of closed cells of more than 90% (DIN-ISO 4590) was exposed for 5 seconds to an excess pressure of 1 bar. The percentage of open cells was then determined to be more than 96%, which, within the limits of accuracy of the method used to determine the open cell content, corresponds to a state of fully open cells. Longer residence times of 10 seconds, 2 minutes, 10 minutes or 30 minutes produced foams with identical open cell contents.

Example 2

The same foam as in Example 1 was exposed to a pressure of 10 bars, with the increase in pressure taking place on a first sample within 5 seconds, on a second sample within 2 minutes and on a third sample within 30 minutes. All three samples had the same percentage of open cells, more than 96%.

Example 3

Conventional rigid foams having bulk densities of 24 kg/m$^3$ and 34 kg/m$^3$ and a percentage of closed cells of more than 90% were subjected within 5 seconds to a pressure of 10 bar, with the pressure being maintained for 10 minutes. Each of the foams had a percentage of open cells of more than 96%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of completely open-celled, rigid polyurethane foams in which the effective free path length of cell gas is restricted mainly to the diameter of the cell comprising applying sufficient external pressure to a closed-cell or partially closed-cell rigid polyurethane foam to cause formation of cracks in the cell walls but not destroy the cell walls.

2. The process of claim 1 in which the closed-cell or partially closed-cell rigid polyurethane foam is in a mold at the time the external pressure is applied.

3. The process of claim 2 in which an airtight barrier is formed or applied to the closed-cell foam before the external pressure is applied.

* * * * *